G. SCARFE.
CONSTANT FLOW METER.
APPLICATION FILED MAR. 31, 1914.
1,109,149.
Patented Sept. 1, 1914.
2 SHEETS—SHEET 1.
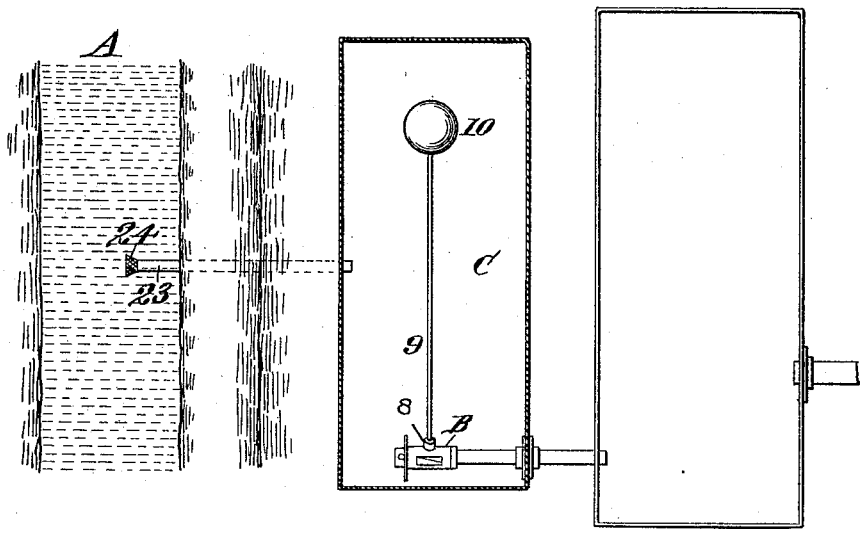
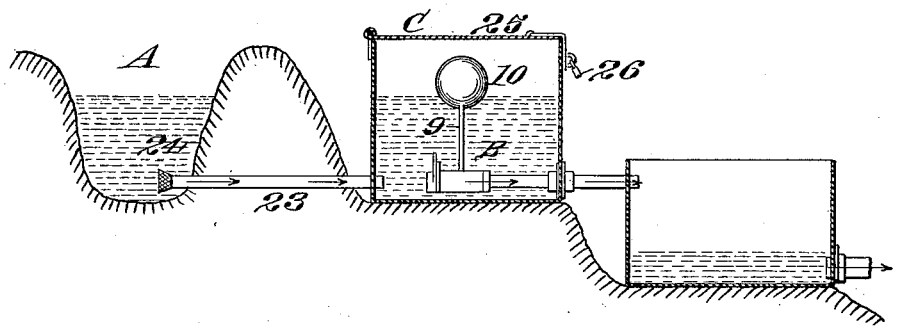
WITNESSES:
INVENTOR
George Scarfe G. SCARFE.
CONSTANT FLOW METER.
APPLICATION FILED MAR. 31, 1914.
1,109,149.
Patented Sept. 1, 1914.
2 SHEETS—SHEET 2.
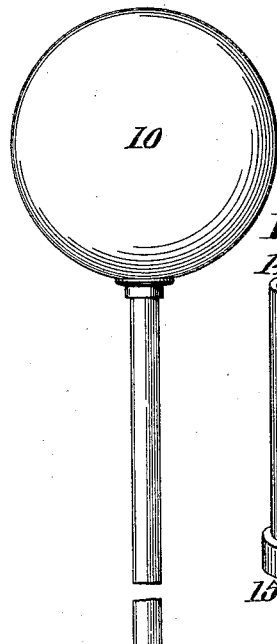
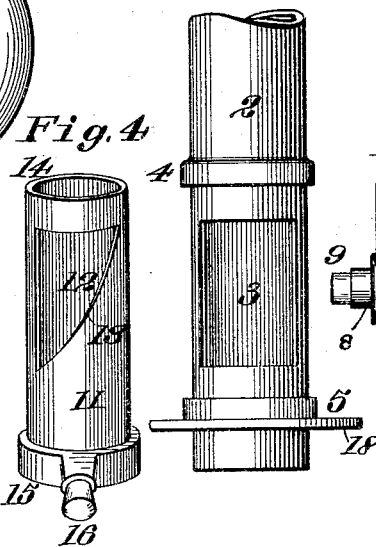
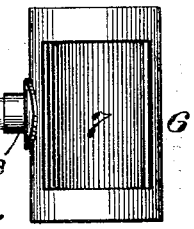
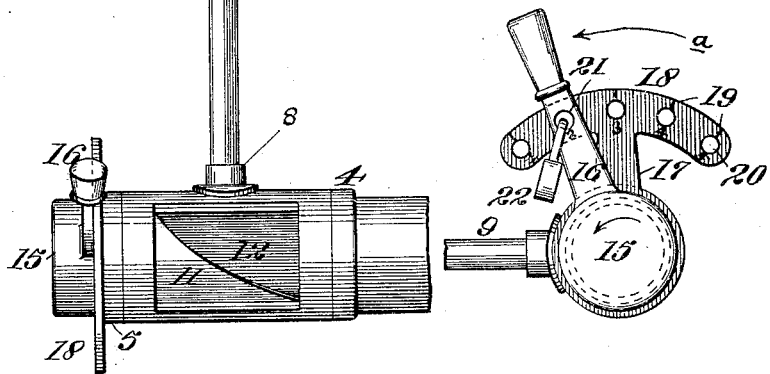
WITNESSES:
Charles Rickles
Thos Eastberg
INVENTOR
George Scarfe,
BY G. H. Strong.
ATTORNEY

UNITED STATES PATENT OFFICE.

GEORGE SCARFE, OF NEVADA CITY, CALIFORNIA.

CONSTANT-FLOW METER.

1,109,149.  Specification of Letters Patent.  Patented Sept. 1, 1914.

Application filed March 31, 1914. Serial No. 828,471.

*To all whom it may concern:*

Be it known that I, GEORGE SCARFE, a citizen of the United States, residing at Nevada City, in the county of Nevada and State of California, have invented new and useful Improvements in Constant-Flow Meters, of which the following is a specification.

This invention relates to a constant flow meter, and in particular to a meter of the character described which is intended for use in measuring water discharging from canals, ditches, tanks, or reservoirs.

One of the objects of the present invention is to provide a meter which is particularly adapted for measuring and delivering a constant volume of water from canals or reservoirs in which the water level is likely to vary, or, in other words, where the water head in the source of supply may change at any time.

Another object of the invention is to provide means for adjusting the meter to increase or decrease the volume or flow of water through same.

Further objects will hereinafter appear.

The invention consists of the parts and the construction and combination of parts as hereinafter more fully described and claimed, having reference to the accompanying drawings, in which—

Figure 1 is a plan view showing the application of the invention. Fig. 2 is a vertical section of Fig. 1. Fig. 3 is a plan view of the meter, showing it connected with a float. Fig. 4 is a detail view of the inner tube. Fig. 5 is a detail view of the cylinder. Fig. 6 is a detail of the outer sleeve. Fig. 7 is an end view of the meter.

Referring to the drawings, A indicates a source of water supply, in this instance represented by a canal, B the meter, and C the meter box. The meter proper consists, primarily, of a cylinder 2, in the upper side of which is formed a rectangular-shaped opening 3. Mounted on the outside of the cylinder, between collars 4 and 5, is a turnable sleeve member 6, having an opening 7 formed therein, of rectangular shape, of a size similar to the opening in the cylinder.

Secured to the sleeve, as at 8, and extending at right angles thereto is an arm 9, on the outer end of which is secured a float 10. Snugly fitted and turnable within the cylinder is a tube 11, and formed in said tube is an opening 12 which is substantially triangular in shape. The hypotenuse of the triangular opening is, however, curved in this instance, as indicated at 13, and the purpose of said peculiar construction will later be described. One end of the tube 11 is open, as indicated at 14, while the other end is closed by a head 15 which extends outside of the cylinder, and secured to said head is a lever arm 16 by which the head, with connected tube, may be turned.

Formed integral with collar 5, or otherwise secured to same, is an upwardly extending arm 17, on the upper end of which is formed a segmental section 18. This segment is graduated or has a scale formed thereon, indicated at 19, and is also provided with a series of perforations 20 with which arm 16 may be brought into register. Arm 16 is provided with a hole 21 and it, therefore, becomes possible to insert a padlock 22, or any other suitable locking mechanism, for securing arm 16, with connected head, and tube in a fixed position.

In actual practice, referring to Figs. 1 and 2, the device is connected as follows: A pipe 23 is first driven through the bank and connected with the meter box; a suitable form of strainer 24 being applied for the usual purpose. The water level within the box, when thus connected, will naturally correspond to that of the canal and will consequently fall and rise as the level of the source of supply rises or falls.

The meter is suitably secured in the bottom of the box and the position of the rectangular opening formed in the sleeve will, under normal conditions, register with the opening in the cylinder. Any increase or rise of water within the box will, however, cause the float, with connected lever, to rise and consequently turn the sleeve on the outside of the cylinder. This will cause the opening 7, in the sleeve, to pass beyond or out of register with opening 3 in the cylinder and will consequently reduce the area of same.

As an example, it may be assumed that the level within the box, under normal conditions, will be about three feet and that the openings in the sleeve and cylinder will register under such conditions. The meter thus opened to its fullest capacity may, as an example, discharge a constant flow of two miner's inches. Any rise or increase of level of water within the box would cause a greater discharge to take place through the meter, as the water head or pressure increases in proportion to the level of the water within the box, if the area of the discharge opening was not reduced. The float, with connected sleeve, has, however, been provided for the purpoes of decreasing the area of the opening 3 in proportion to the increase of head of the water within the box. A constant flow or discharge from the meter is thus automatically maintained regardless of the head. Means have also been provided for the purpose of adjusting the meter to increase or decrease the volume or flow of water through same. For instance, it is possible to set the meter to discharge two miner's inches, or it is possible to regulate the meter to discharge three, four or five inches, or any other desired quantity. The tube 11 has been provided for this purpose and the regulation of the flow through the meter is accomplished by turning the tube in one direction or the other so as to bring opening 12 into or out of register with opening 3 in the cylinder. If it is desired to cut down the amount, for instance, from five miner's inches to two miner's inches, it is accomplished by turning the tube in the direction of arrow $a$ or toward the float, the initial opening being thereby made smaller.

The shape of the opening or the curved line of the hypotenuse, above referred to, is determined by the variation in flow which it is desired to secure. The variation in head is, however, taken care of by the sleeve and the float attached to same.

It can easily be seen, by referring to Fig. 3, that the area of the rectangular-shaped discharge opening, indicated at 3, may be easily increased or decreased by turning tube 11, so that the opening therein, indicated at 12, will be brought more or less out of register with opening 3; that is, Fig. 3 shows the tubular opening in full register with opening 3; the meter being in this instance set to its fullest capacity. If it is desired to reduce the volume of flow through same, it is only necessary to turn the tube through the medium of lever 16 and head 15 in the direction of arrow $a$ which will consequently reduce the area and the volume of water flowing through same.

A meter constructed as here shown may be easily adjusted by authorized persons and set to give the desired flow as the graduated segment is marked from one to five which indicates the flow of the meter.

The lock, indicated at 22, is only applied to prevent outside persons from tampering with the meter or disturbing the adjustment or setting of same.

The meter is further protected from being tampered with by placing a cover 25 over the box, which cover is secured by a suitable form of lock, indicated at 26.

The materials and finish of the several parts of the meter are such as the experience and judgment of the manufacturer may dictate.

Having thus described my invention, what I claim and desire to secure by Letters Patent is—

1. In a meter, the combination of a cylinder having inlet and outlet openings formed therein, a sleeve turnable on the cylinder having an opening formed therein which is normally adapted to register with the inlet opening in the cylinder, a source of water supply, means controlled by the rise or fall of water in the source of supply for turning the sleeve to increase or decrease the area of the inlet opening, and means for increasing or decreasing the area of the inlet opening in the cylinder independent of the turnable sleeve.

2. In a meter, the combination of a cylinder having inlet and outlet openings formed therein, a sleeve turnable on the cylinder having an opening formed therein which is normally adapted to register with the inlet opening in the cylinder, a source of water supply, and means controlled by the rise or fall of water in the source of supply for turning the sleeve to increase or decrease the area of the inlet opening.

3. In a meter, the combination of a cylinder having inlet and outlet openings formed therein, a sleeve turnable on the cylinder having an opening formed therein which is normally adapted to register with the inlet opening in the cylinder, a source of water supply, an arm secured to the sleeve, and a float on the arm controlled by the rise or fall of water in the source of supply for turning the sleeve to increase or decrease the area of the inlet opening.

4. In a meter, the combination of a cylinder having inlet and outlet openings formed therein, a sleeve turnable on the cylinder having an opening formed therein which is normally adapted to register with the inlet opening in the cylinder, a source of water supply, means controlled by the rise or fall of water in the source of supply for turning the sleeve to increase or decrease the area of the inlet opening, and means interior of the cylinder for increasing or decreasing the area of the inlet opening.

5. In a meter, the combination of a cylinder having inlet and outlet openings formed therein, a sleeve turnable on the cylinder having an opening formed therein which is normally adapted to register with the inlet opening in the cylinder, a source of water supply, an arm secured to the sleeve, a float on the arm controlled by the rise or fall of water in the source of supply for turning the sleeve to increase or decrease the area of the inlet opening, and means interior of the cylinder for increasing or decreasing the area of the inlet opening.

6. In a meter, the combination of a cylinder having inlet and outlet openings formed therein, a sleeve turnable on the cylinder having an opening formed therein which is normally adapted to register with the inlet opening in the cylinder, a source of water supply, means controlled by the rise or fall of water in the source of supply for turning the sleeve to increase or decrease the area of the inlet opening, a tube turnably mounted within the cylinder having an opening formed therein which is adapted to be brought into and out of register with the inlet opening, and means for turning said tube.

7. In a meter, the combination of a cylinder having inlet and outlet openings formed therein, a sleeve turnable on the cylinder having an opening formed therein which is normally adapted to register with the inlet opening in the cylinder, a source of water supply, an arm secured to the sleeve, a float on the arm controlled by the rise or fall of water in the source of supply for turning the sleeve to increase or decrease the area of the inlet opening, a tube turnably mounted within the cylinder having an opening formed therein which is adapted to be brought into and out of register with the inlet opening, and means for turning said tube.

8. In a meter, the combination of a cylinder having inlet and outlet openings formed therein, a sleeve turnable on the cylinder having an opening formed therein which is normally adapted to register with the inlet opening in the cylinder, a source of water supply, means controlled by the rise or fall of water in the source of supply for turning the sleeve to increase or decrease the area of the inlet opening, a tube turnably mounted within the cylinder having an opening formed therein which is adapted to be brought into and out of register with the inlet opening, a head on the end of the tube projecting out through the end of the cylinder, a lever secured to said head, and means for locking the lever.

9. In a meter, the combination of a cylinder having inlet and outlet openings formed therein, a sleeve turnable on the cylinder having an opening formed therein which is normally adapted to register with the inlet opening in the cylinder, a source of water supply, an arm secured to the sleeve, a float on the arm controlled by the rise or fall of water in the source of supply for turning the sleeve to increase or decrease the area of the inlet opening, a tube turnably mounted within the cylinder having an opening formed therein which is adapted to be brought into and out of register with the inlet opening, a head on the end of the tube projecting out through the end of the cylinder, a lever secured to said head, and means for locking the lever.

10. In a meter, the combination of a cylinder having inlet and outlet openings formed therein, a sleeve turnable on the cylinder having an opening formed therein which is normally adapted to register with the inlet opening in the cylinder, a source of water supply, an arm secured to the sleeve, a float on the arm controlled by the rise or fall of water in the source of supply for turning the sleeve to increase or decrease the area of the inlet opening, a tube turnably mounted within the cylinder having an opening formed therein which is adapted to be brought into and out of register with the inlet opening, a head on the end of the tube projecting out through the end of the cylinder, a lever secured to said head, means for locking the lever, a box in which the meter is mounted, a pipe connecting said box with the source of supply, and means for closing and locking the box.

In testimony whereof I have hereunto set my hand in the presence of two subscribing witnesses.

GEORGE SCARFE.

Witnesses:
JOHN WERRY,
WILLIAM E. MESENEY.